United States Patent

[11] 3,630,381

| [72] | Inventors | Hans Gujer<br>Glattalstrasse 149, Rumlang, Zurich;<br>Karl Koller, Zurich, both of Switzerland |
|---|---|---|
| [21] | Appl. No. | 838,293 |
| [22] | Filed | July 1, 1969 |
| [45] | Patented | Dec. 28, 1971 |
| [73] | Assignee | said Gujer, by said Koller |
| [32] | Priorities | July 7, 1968 |
| [33] | | Switzerland |
| [31] | | 9846/68;<br>Oct. 8, 1968, Switzerland, No. 14992/68 |

[54] DEVICE FOR SEALING OFF THE FILTER PRESS CAVITY BETWEEN TWO FILTER PRESS ELEMENTS, PREFERABLY TWO REVOLVING FILTER PRESS BANDS OR BELTS OF A FILTER PRESS
18 Claims, 8 Drawing Figs.

| [52] | U.S. Cl. | 210/400, / |
| [51] | Int. Cl. | B01d 33/04 |
| [50] | Field of Search | 100/114 (122), 205, 222, 223, 295, 296; 251/317, 318; 24/30.5; 210/224, 226, 227, 230, 231, 400 |

[56] References Cited
UNITED STATES PATENTS

| 276,846 | 5/1883 | Mann et al. | 100/114 |
| 1,607,619 | 11/1926 | Hamilton | 100/114 |
| 3,098,429 | 7/1963 | Hagglund | 100/211 |
| 3,141,221 | 7/1964 | Faulls, Jr. | 24/30.5 |

*Primary Examiner*—Reuben Friedman
*Assistant Examiner*—T. A. Granger
*Attorney*—Werner W. Kleeman ABSTRACT: An installation or device is disclosed for sealing off the filter press cavity between two filter press elements, preferably two revolving filter press bands of a filter press. Elastic sealing strips are disposed between the filter press surfaces at least at two opposite sides of the filter press cavity. The sealing strips have a V-shaped cross section with extensions pointing outwardly at the free ends of the shanks of the V, with the extensions engaging in suitable grooves in the sides of the filter press element.

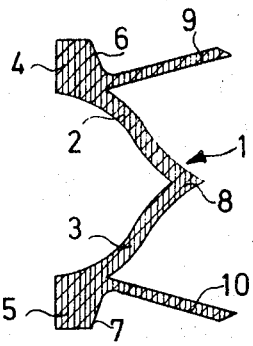
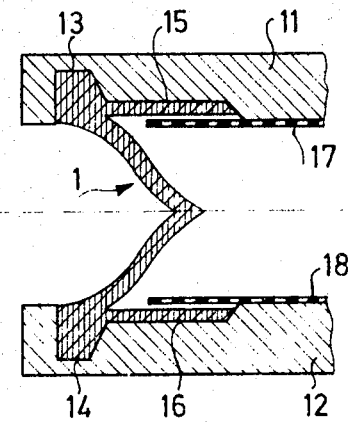
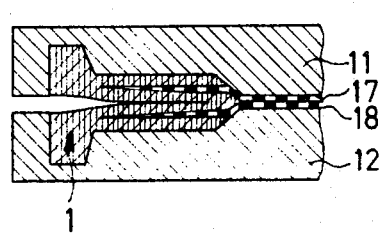
Fig. 1
Fig. 2
Fig. 3

DEVICE FOR SEALING OFF THE FILTER PRESS CAVITY BETWEEN TWO FILTER PRESS ELEMENTS, PREFERABLY TWO REVOLVING FILTER PRESS BANDS OR BELTS OF A FILTER PRESS

BACKGROUND OF THE INVENTION

The instant invention generally relates to sealing devices and particularly concerns a device or installation for sealing off the filter press cavity formed between two filter press elements, preferably two revolving filter press bands of a filter press having elastic sealing strips disposed at least at two opposite sides of the filter press cavity between the filter press elements.

A number of filter presses and particularly band filter presses are known in the art. With band filter presses, press products are pressed out between two revolving filter press bands which are each laterally sealed off by virtue of a sealing device for the formation of the filter press cavity. Such filter presses are arranged vertically as a rule, such that they form a vertically directed filter press cavity which tapers off toward the lower end. In spite of various advantages, filter presses of this type, have not, at this time, been utilized fully since the practical construction thereof encounters various difficulties. Specifically, no acceptable solution is known in the art for laterally sealing off the filter press cavity. All of the known sealing devices such as sealing bands guided separately and endlessly by the filter press bands and adhering laterally to the filter press bands, are not able to effectively seal off the filter press cavity. Furthermore, known sealing devices begin to leak at a very early stage as the press pressure increases.

SUMMARY OF THE INVENTION

Accordingly, a need exists in the art for the provision of a sealing device or installation which can effectively laterally seal off the filter press cavity. It is the primary object of the instant invention to satisfy this need. Specifically, it is an object of the instant invention to provide a sealing device which avoids the above-mentioned drawbacks and which enables a perfect sealing of the filter press cavity between two filter press elements, preferably two revolving filter press bands of a filter press.

These objects as well as others which will become apparent as the description proceeds, are implemented by the inventive device for sealing off the filter press cavity between two filter press elements, preferably two revolving filter press bands of a filter press, such device or installation being characterized by the provision of elastic sealing strips disposed at least two opposite sides of the filter press cavity between the filter press surfaces. In accordance with the instant invention, the sealing strips have a V-shaped cross section with extensions pointing outwardly at the free ends of the shanks of the V, these extensions engaging in corresponding grooves provided in the sides of the filter press elements.

The novel sealing strip has many quite decisive advantages. By virtue of the V-shaped cross-sectional construction and the extensions pointing outwardly at the free ends of the shanks, the sealing strip can both adjust itself without difficulty to the gap of the filter press cavity which changes during the press operation as well as ensure, in this mode, that the filter press cavity is perfectly sealed off.

In accordance with the instant invention, two basic constructions are provided for the sealing device. In one embodiment, the filter press elements and the sealing strip are constructed such that the pointed top of the V points towards and into the filter press cavity. In this instance, the sealing strip is loaded via the outside of the shanks of the V and is pushed with its extensions into the grooves of the filter press elements serving as a countersupport. As a result, a tight connection between the sealing strip and the filter press elements and thus a tight closure of the filter press cavity is achieved. For improving the pressing action on the extensions in the grooves, it is advantageous to equip the sealing strip at the free ends of the shanks and on the outside with lips pointing in the direction of the pointed top of the V, the lips being pressed directly by the press product towards the filter press elements and serving to hold the sealing strip. The V-like cross section of the sealing strip permits the strip to be constructed in such a fashion that it does not evaginate outwardly due to the pressure of the press product which would render the seal ineffective.

In the second embodiment of the novel sealing device or installation, the sealing strips are disposed between the filter press elements in such a fashion that the pointed top of the V points away from the filter press cavity. With this arrangement, the danger of evagination of the sealing strip is no longer present. Moreover, in this instance, the pressure of the press product acts upon the inside of the shanks and, as a result, the pressing force of the shanks or their extensions, respectively, into the grooves of the filter press elements takes place both better and safer. By extending the free ends of the shanks, it is possible to achieve a still further improvement of the pressing force or effect of the extensions into the grooves.

It is particularly advantageous if the shanks of the cross-sectional V-like sealing strips have a mirror-inverted symmetric configuration such that the V has an acute angle at least on the inside where the shanks connect. This configuration permits constructing the pointed top stiffer than the connecting areas of the shanks to the extensions. On the other hand, this particular construction further facilitates pressing the press product out of the pockets formed between the shanks and the filter press elements when the gap between the filter press elements narrows during the filter press operation.

It is also advantageous to provide for still further recesses in the filter press elements in addition to the grooves in such a manner that when the filter press elements come into contact, the sealing strips can at least partially, but preferably completely, be taken up by the recesses. It is thus possible to reduce the gap of the filter press cavity practically to zero.

The sealing strip itself is elastic and preferably can consist of natural or synthetic rubber. In a preferred embodiment, such sealing strip is constructed of "Neoprene."

The novel sealing strip of the instant invention is particularly adapted and suitable for revolving filter press bands. One such type filter press utilizing revolving filter press bands and with which the sealing installation of the present invention has particular utility has been disclosed in U.S. application, Ser. No. 37,162, filed May 14, 1970, entitled "Band Filter Press," and listing as inventor Hans Gujer, one of the co-inventors of this application. In this mode, the sealing strips are advantageously constructed in an endless fashion and are preferably of the same length as one of the filter press bands. It is further advantageous if the sealing strip is also mounted at the one filter press band such that it revolves together with the band. In other instances, however, it could be advantageous to guide the sealing strips separately from the filter press bands outside of the area of the filter press cavity. Particularly in the case wherein the sealing device is constructed with the pointed tops of the V facing away from the filter press cavity, the pointed top of the V could be fashioned such that it can be guided over deflector and guide installations. A construction suitable here, for example, would be such that the pointed top of the V is fashioned with a bulge having the cross section of a V-belt.

In order to form the filter press cavity, the sealing strip then engages in each instance in the grooves and, where applicable, in the recesses of the filter press bands.

BRIEF DESCRIPTION OF THE DRAWINGS

The invention itself will be better understood and further advantageous features will become more evident from the following detailed description of preferred inventive embodiments, such description making reference to the appended sheets of drawings wherein:

FIG. 1 depicts, in cross section, a first embodiment of the sealing strip intended to be mounted in such a fashion that the pointed top of the V faces the filter press cavity;

FIG. 2 depicts, in cross section, the sealing strip according to FIG. 1 inserted between two filter press elements, wherein the filter press elements are at a greater distance from one another;

FIG. 3 depicts the arrangement pursuant to FIG. 2, but wherein the distance between the filter press elements is practically zero;

The same reference numerals are utilized for like parts throughout the following description.

DETAILED DESCRIPTION OF PREFERRED INVENTIVE EMBODIMENTS

Figure 4:
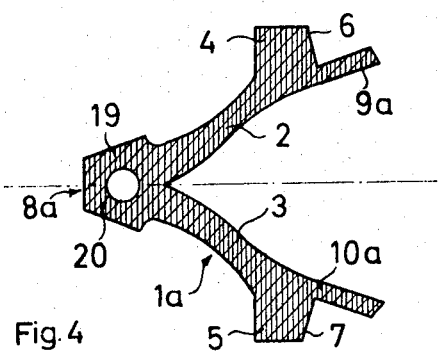
FIG. 4 depicts, in cross section, a second embodiment of a sealing strip intended to be mounted in such a manner that the pointed top of the V faces away from the filter press cavity.

Referring now to FIG. 1, a first embodiment of a sealing strip 1 is depicted, the sealing strip having a middle portion with a V-like cross section. Outwardly pointing extensions 4 and 5 are provided on the free ends of shanks 2 and 3. Both extensions of both shanks are disposed on a single plane. The extensions 4 and 5 narrow outwardly on their sides 6 and 7 which face the filter press cavity.

The shanks 2 and 3 of the cross-sectional V-like portion of the sealing strip 1 have a mirror-inverted symmetrical configuration in such a fashion that the V forms a pointed top 8 at the point of connection of the shanks 2 and 3 with at least the insides of shanks 2 and 3 converging at the pointed top at an acute angle. The sealing strip is preferably stiffer in the area of pointed top 8 of the V than in the area where shanks 2 and 3 connect with extensions 4 and 5. At the free ends of shanks 2 and 3, lips 9 and 10 are provided pointing in the direction of the pointed top 8 of the V, the lips each being preferably inclined outwardly such that the sealing strip has an overall cross-sectional W shape.

FIG. 2 depicts how the sealing strip 1 is mounted between two filter press elements 11 and 12. The filter press elements are provided with grooves 13 and 14 for this purpose into which the extensions 4 and 5 of sealing strip 1 engage. Furthermore, the filter press elements 11 and 12 are provided with recesses 15 and 16 which point towards the interior of the filter press cavity from grooves 13 and 14 in such a fashion that the sealing strips are completely taken up by the recesses when the filter press elements come into contact as is depicted in FIG. 3. Accordingly, the filter press cavity can be reduced to zero.

Filter cloths 17 and 18 covering the filter press elements extend up to and between the shanks 2 and 3 in the adjoining lips 9 and 10.

Figure 5:
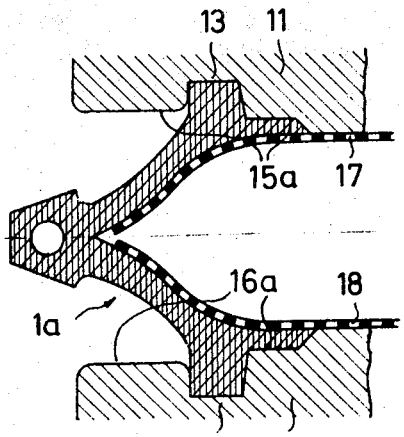
FIG. 5 depicts the sealing strip according to FIG. 4 inserted between two filter press elements, the filter press elements being at a greater distance from one another.
Figure 6:
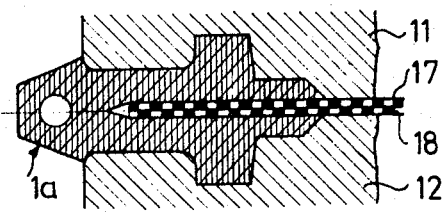
FIG. 6 depicts the arrangement pursuant to FIG. 5 but wherein the filter press elements are at a different distance which is practically zero.

FIGS. 4 through 6 depict a second embodiment of a sealing strip 1a which likewise has a V-shaped cross section. However, the sealing strip here is intended to be mounted such that its pointed top 8a faces away from the filter press cavity. At the free ends of shanks 2 and 3, extensions 4 and 5 pointed outwardly are likewise provided. The two extensions of both shanks are again disposed on the same plane. The extensions narrow outwardly, that is to say, on their sides 6 and 7 which face the filter press cavity.

Similarly as with the embodiment depicted in FIGS. 1 through 3, shanks 2 and 3 of the cross-sectional V-like sealing strip 1a of FIGS. 4 through 6 have a mirror-inverted symmetrical configuration and are preferably slightly curved. Pointed top 8a of the V is preferably provided with a reinforcement 19 which is suitably shaped like a wedge in the fashion of the cross section of a V-belt. The sealing strip can be guided via deflector rolls or rollers over the wedge-shaped reinforcement 19. If the sealing strip is subjected to particularly strong demands, reinforcement 19 can be reinforced still further by means of an insert 20.

The free ends of shanks 2 and 3 are preferably extended by lips 9a and 10a. These lips have a lesser strength than shanks 2 and 3 and thus can bend more easily. The purpose of the lips preferably is to press the sealing strip 1a against the filter press elements by virtue of the pressure existing in the filter press cavity.

Similarly, with respect to the embodiment of FIG. 2, FIG. 5 depicts how the sealing strip 1a is mounted between two filter press elements 11 and 12. The filter press elements are provided with grooves 13 and 14 for this purpose into which engage extensions 4 and 5 of the sealing strip 1a. Furthermore, filter press elements 11 and 12 are equipped with recesses 15a and 16a in such a fashion that the insides of the shanks are practically flush with the surfaces of the filter press elements when the latter come into contact as is shown in the example of FIG. 6. Thus, the filter press elements can be pressed against one another practically to zero distance such that the filter press cavity can theoretically be reduced to the zero value.

The filter cloths 17 and 18 covering filter press elements 11 and 12 extend between shanks 2 and 3 up to pointed top 8a of the sealing strip.

In the embodiment of FIGS. 1 through 3, it is possible that filter cake residues may remain in the pockets during individual pressing operation, the pockets being formed by shanks 2, 3 and lips 9, 10. This undesirable result can completely be avoided by utilizing the sealing strip of FIGS. 4 through 6.

Figure 7:
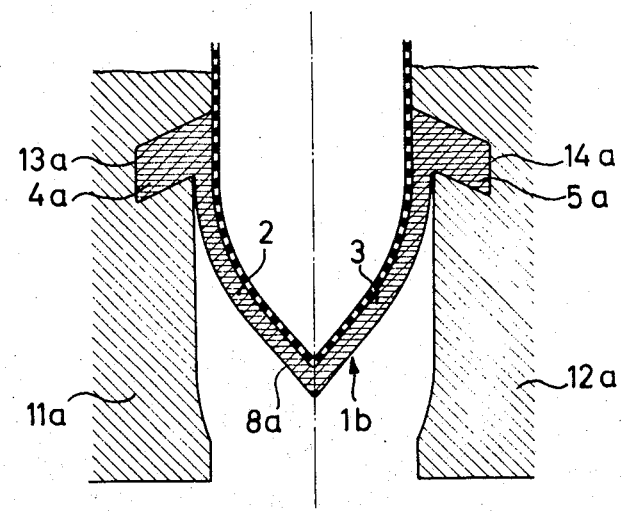
FIG. 7 depicts, in cross section, a third embodiment of a sealing strip between two filter press elements which are disposed at a distance from one another, wherein the pointed top of the cross-sectional V-like sealing strip faces away from the filter press cavity.
Figure 8:
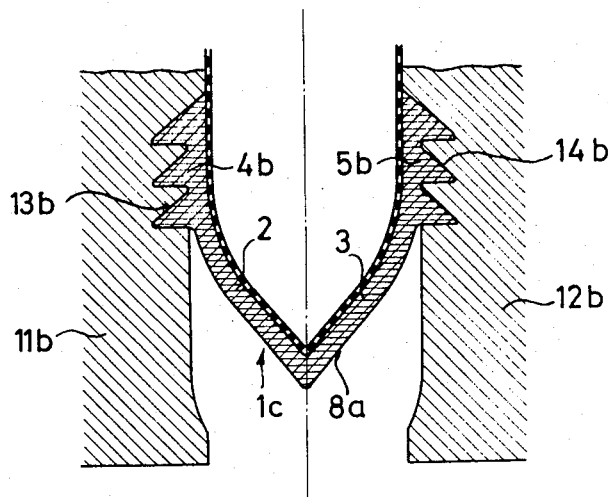
FIG. 8 depicts, in cross section, a fourth embodiment of the sealing strip between two filter press elements disposed at a distance from one another wherein the pointed top of the cross-sectional V-like sealing strip is facing away from the filter press cavity.

FIGS. 7 and 8 depict further sealing strips 1b and 1c, which are constructed similarly to the sealing strip of FIGS. 4 through 6. In this instance, the pointed top of the V of the sealing strips also is on the side facing away from the filter press cavity. In contrast to sealing strip 1a, sealing strips 1b and 1c have modified extensions 4a, 5a and 4b, 5b. Here, the extensions in each instance are constructed such that they are inclined away from the press cavity and such that they engage in correspondingly inclined recesses 13a, 14a, and 13b, 14b in the filter surfaces 11a, 12a and 11b, 12b. By virtue of the press pressure in the filter press cavity, the extensions are pushed into the recesses and are prevented from slipping out due to the inclined construction.

The embodiment of FIG. 8 further depicts how extensions 4b and 5b can be constructed as toothed strips. Of course, it is necessary to construct the recesses 13b and 14b in filter surfaces 11b and 12b analogously to extensions 4b and 5b. In the embodiments of FIGS. 7 and 8, the sealing strips are secured in the filter press elements in such a fashion that one can forego the lips 9a and 10a, if desired, pursuant to the embodiments of FIGS. 4 through 6, extending the free ends of the shanks. Moreover, in the sealing strips 1b and 1c of FIGS. 7 and 8 it is possible to construct the pointed tops of the V in a reinforced fashion analogously to the embodiments of FIGS. 4 through 6.

The sealing strips in each instance are elastic and are preferably constructed of natural or synthetic rubber. In a preferred embodiment, such sealing strips are made of "-Neoprene."

In the situation wherein the filter press elements are constructed as filter press bands, if desired, the sealing strip can have the length of a filter press band. Then, the sealing strip can be mounted in the groove and, if desired, in the recess of the filter press band and can revolve with the filter press band.

For the purpose of simplified assembly as well as simplified replacement, however, the sealing strips are returned outside of the filter press cavity preferably separately from the filter press bands, for example, vertically to the latters' plane of return. For this purpose, the sealing strips after and before the filter press cavity can easily be returned by a deflector roller from the outlet side of the filter press cavity to the inlet side preferably by means of a wedge-shaped reinforcement 19.

With the embodiment of FIGS. 4 through 8, the sealing strips can be deflected particularly easily since the shanks of the sealing strips can easily be bent up during the deflecting phase.

As should be apparent, the instant sealing device or installation comprising the novel sealing strip enables the production of a filter press in which practically all press materials can be perfectly pressed out. In this regard, the filter press cavity is always securely sealed off during the press operation. The novel sealing strip thus comprises a decisive contribution in the art for the creation of a well-functioning filter press and, in particular, a band filter press.

The objects set forth at the outset of this specification have thus been successfully achieved, and, accordingly,

What is claimed is:

1. An installation for sealing off the filter press cavity formed between two revolving filter press bands of a band filter press, said filter press bands being situated opposite one another in confronting relationship, each of said bands having grooves in confronting sides thereof which define boundary walls of the press cavity, elastic sealing strips extending between the confronting sides of the bands at least at two opposite ends of the filter press cavity, said elastic sealing strips extending substantially transversely with respect to said confronting sides of said filter press bands for sealing the press cavity, each of said sealing strips having a substantially V-shaped cross-sectional configuration providing shanks of a V with extensions pointing outwardly at the free ends of said shanks and in a direction away from said press cavity, said extensions engaging with said grooves of the confronting sides of said bands.

2. An installation as defined in claim 1, wherein the pointed tops of the V are disposed toward the filter press cavity.

3. An installation as defined in claim 1 wherein the pointed tops of the V are disposed away from the filter press cavity.

4. An installation as defined in claim 1, wherein extensions of both shanks are disposed in one plane and wherein said extensions are provided at the ends of said shanks facing away from the pointed top of the V.

5. An installation as defined in claim 1, wherein said extensions narrow outwardly on their sides facing the filter press cavity.

6. An installation as defined in claim 1, wherein said extensions are constructed as toothed strips.

7. An installation as defined in claim 1, wherein said extensions are constructed so as to be inclined away from the filter press cavity.

8. An installation as defined in claim 1, wherein said shanks of said sealing strips have a mirror-inverted symmetrical configuration and wherein the V defines an acute angle at least on the inside thereof where the shanks meet.

9. An installation as defined in claim 1, wherein said sealing strip is stiffer in the area of the pointed top of the V than in the area where said shanks meet with said extensions.

10. An installation as defined in claim 1, wherein the pointed top of the V has a wedge-shaped reinforcement containing a reinforcement insert extending along the sealing strip.

11. An installation as defined in claim 1, wherein the free ends of said shanks each have a lip extending in the direction of the filter press cavity and serving to extend said shanks.

12. An installation as defined in claim 1, wherein said sealing strip has lips provided at the free ends of said shanks and pointing in the direction of the pointed tip of the V.

13. An installation as defined in claim 2, wherein said sealing strip has lips provided at the free ends of said shanks and pointing in the direction of the pointed tip of the V, and wherein filter cloths are provided for covering the filter press bands, such filter cloths extending to and between said shanks in the adjoining lips.

14. An installation as defined in claim 3, wherein filter cloths are provided covering the filter press bands, such filter cloths extending between said shanks up to the pointed tip of the V.

15. An installation as defined in claim 1, wherein the filter press bands are provided with recess means proceeding from said grooves in a fashion such that said sealing strips are taken up by said recess means and wherein the filter press bands can be brought into contact with one another.

16. An installation as defined in claim 1, wherein said sealing strips are constructed endlessly as the filter press bands revolve, said sealing strips having a length of at least one filter press band and being provided in said grooves of said at least one filter press band.

17. An installation as defined in claim 1, further including filter cloth means located at the region of each of and overlying the confronting sides of said bands.

18. An installation for sealing off in fluidtight fashion the filter press cavity formed between two revolving filter press bands of a band filter press, said filter press bands being situated opposite one another in confronting relationship, each of said bands having grooves in confronting sides thereof which define boundary walls of the press cavity, elastic sealing strips extending between the confronting sides of the bands at least at two opposite ends of the filter press cavity, said elastic sealing strips extending substantially transversely with respect to said confronting sides of said filter press bands for sealing the press cavity, each of said sealing strips having a substantially V-shaped cross-sectional configuration providing elastic shanks of a V with extensions pointing outwardly at the free ends of said shanks and in a direction away from said press cavity, said extensions engaging with said grooves of the confronting sides of said bands, said elastic shanks acting upon said extensions to bias them into snug seating engagement with said grooves, to thereby promote the sealing action of the press cavity afforded by said elastic sealing strips.

* * * * *